(12) United States Patent
Mutikainen et al.

(10) Patent No.: US 9,402,212 B2
(45) Date of Patent: Jul. 26, 2016

(54) METHOD FOR SRVCC SOLUTION

(75) Inventors: Jari Mutikainen, Lepsämä (FI); Curt Wong, Sammamish, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 154 days.

(21) Appl. No.: 13/884,165

(22) PCT Filed: Jul. 4, 2011

(86) PCT No.: PCT/EP2011/061182
§ 371 (c)(1),
(2), (4) Date: Jul. 24, 2013

(87) PCT Pub. No.: WO2012/062488
PCT Pub. Date: May 18, 2012

(65) Prior Publication Data
US 2013/0294407 A1    Nov. 7, 2013

Related U.S. Application Data

(60) Provisional application No. 61/411,176, filed on Nov. 8, 2010.

(51) Int. Cl.
*H04W 36/00* (2009.01)
*H04L 29/06* (2006.01)

(52) U.S. Cl.
CPC ....... *H04W 36/0055* (2013.01); *H04L 65/1016* (2013.01); *H04L 65/1083* (2013.01); *H04W 36/0022* (2013.01); *H04W 36/0027* (2013.01); *H04W 36/0066* (2013.01)

(58) Field of Classification Search
CPC ............... H04W 36/0022; H04W 36/0055; H04W 36/0027; H04W 36/0066; H04L 65/1016; H04L 65/1083
USPC .................................................. 370/331
See application file for complete search history.

(56) References Cited

U.S. PATENT DOCUMENTS

2011/0040836 A1* 2/2011 Allen et al. ............ 709/205
2013/0142168 A1* 6/2013 Vedrine et al. ........ 370/331

OTHER PUBLICATIONS

3GPP TR 23.886 v10.0.0, Sep. 2010, 3GPP.*
3GPP TR 23.237 v10.3.0, Sep. 2010, 3GPP.*
International Search Report and Written Opinion dated Nov. 4, 2011 corresponding to International Patent Application No. PCT/EP2011/061182.

(Continued)

*Primary Examiner* — Jae Y Lee
(74) *Attorney, Agent, or Firm* — Squire Patton Boggs (US) LLP

(57) ABSTRACT

A method is provided for single radio voice call continuity from E-UTRAN to UTRAN, comprising receiving a single radio voice call continuity request for handover from packet switched access of a source radio access network to circuit switched access of a target radio access network, sending a query to determine whether last active session is a voice only or a video session, and receiving a response to said query indicating whether said last active session is a voice only or a video session.

51 Claims, 8 Drawing Sheets

(56) References Cited

OTHER PUBLICATIONS

3GPP TS 23.237 V10.3.0 (Sep. 2010), Technical Specification, "3rd Generation Partnership Project; Technical Specification Group Services and System Aspects; IP Multimedia Subsystem (IMS) Service Continuity; Stage 2 (Release 10)," Sep. 29, 2010, pp. 1-149, XP05Q442324.

3GPP TR 23.886 V10.0.0 (Sep. 2010), Technical Specification, "3rd Generation Partnership Project; Technical Specification Group Services and System Aspects; Feasibility Study of Single Radio Video Call Continuity (vSRVCC); Stage 2 (Release 10)," Sep. 29, 2010, pp. 1-33, XP050442337.

3GPP Ts 23.216 V9.5.0 (Sep. 2010), Technical Specification, "3rd Generation Partnership Project; Technical Specification Group Services and System Aspects; Single Radio Voice Call Continuity (SRVCC); Stage 2 (Release 9)," Sep. 29, 2010, pp. 1-42, XP050442319.

\* cited by examiner

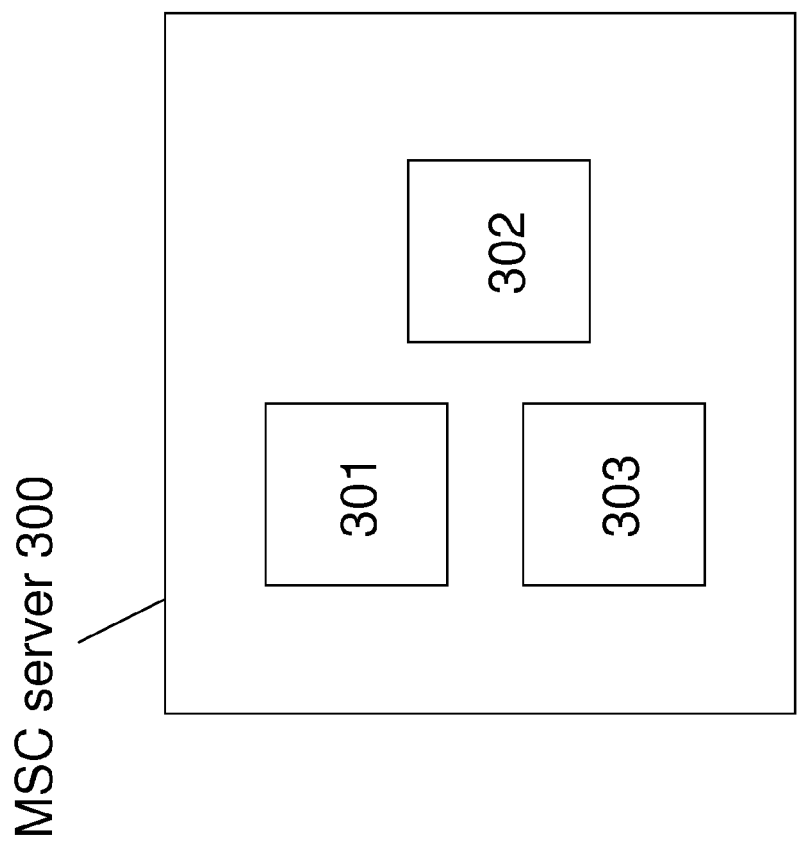

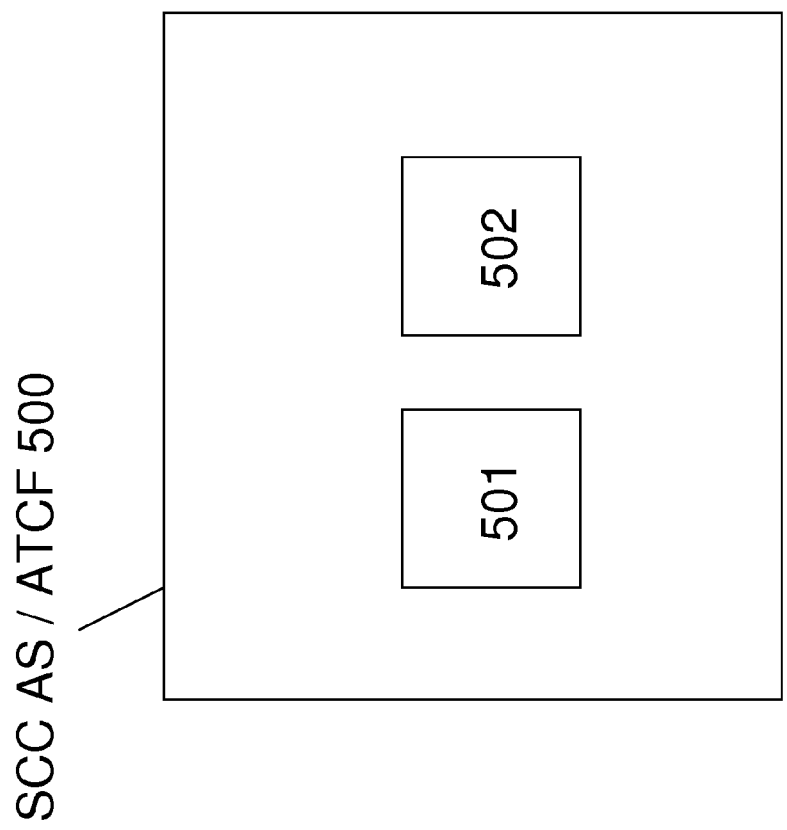

METHOD FOR SRVCC SOLUTION

In the area of mobile telecommunications, the performance of single radio voice call, continuity (SRVCC) can be enhanced so as to provide video single radio voice call continuity (vSRVCC). Particularly, SRVCC/vSRVCC procedures can be configured for more efficient use of radio resources.

The third generation partnership project (3GPP) release eight (rel 8) and later describes a network. The network aims to support universal mobile telecommunication system (UMTS) terrestrial access network (UTRAN), evolved UTRAN (E-UTRAN), and GERAN. 3GPP technical specification (TS) 23.216 specifies SRVCC, which enables voice call to be handed from E-UTRAN/UTRAN packet switched (PS) access to UTRAN/GERAN or 3GPP2 1×CS circuit switched (CS) access. At the edge of E-UTRAN/UTRAN high speed packet access (HSPA) networks, internet protocol (IP) multimedia subsystem (IMS) controlled voice calls can be handed to a circuit switched (CS) network that presently has wider coverage.

Video call continuity from IMS over E-UTRAN access to UTRAN access for calls that are anchored in IMS is also being specified in 3GPP. The definition of SRVCC above is enhanced to mean the process of continuing a voice (or video) call as a user moves from IMS over E-UTRAN access to UTRAN access. The usage of the term SRVCC in 3GPP specifications will keep its original meaning, i.e. voice call continuity, and the term vSRVCC is introduced for single radio video call continuity to differentiate it from single radio voice call continuity (SRVCC).

SRVCC/VSRVCC procedures become more complicated if a user equipment (UE) has multiple simultaneous IMS sessions in active mode.

SUMMARY

It is therefore an object of this invention to address some of the shortcomings by providing method, apparatuses, a system, and a computer program product as defined in the independent claims. Some of the further embodiments of the invention are disclosed in the dependent claims.

According to first aspect of the invention, there is provided a method for single radio voice call continuity (from E-UTRAN to UTRAN), comprising receiving (e.g. by MSC) a single radio voice call continuity request for handover from packet switched access of a source radio access network to circuit switched access of a target radio access network, sending a query (e.g. to SCC AS or ATCF) to determine whether last active session is a voice only or a video session, and receiving a response to said query indicating whether said last active session is a voice only or a video session.

According to a further embodiment, the method further comprises reserving a call bearer from said target radio access network. According to a yet further embodiment, the method comprises reserving a voice call bearer from said target radio access network in case said last active session is a voice only session. In some embodiments, said voice call bearer is a TS11 bearer. According to a further embodiment, the method comprises reserving a multimedia call bearer from said target radio access network, in case said last active session is a video session. In some embodiments, said multimedia call bearer is a BS30 bearer.

In some embodiments, said query and said response comprise session initiation protocol signaling messages. In some embodiments, said query comprises a SIP SUBSCRIBE or a SIP INVITE message. In some embodiments, said response comprises a SIP NOTIFY or a SIP INFO message.

In some embodiments, said request is received from a mobility management entity. In some embodiments, said query is sent to service consistency and continuity application server or access transfer control, function. In some embodiments, said method is performed at a mobile switching centre server.

According to a further embodiment, the method further comprises forwarding a handover command from said target radio access network to said mobility management entity. According to yet a further embodiment, the method further comprises starting session continuity procedures with consistency and continuity application server or access transfer control function. According to a further embodiment, the method further comprises reserving a voice call bearer from said target radio access network in case said multimedia call bearer is not available. In some embodiments, said voice call bearer is a TS11 bearer. In some embodiments, said multimedia bearer is a BS30 bearer.

According to a second aspect of the invention, there is provided an apparatus (e.g. an MSC enhanced for SRVCC) comprising a first input configured to receive a single radio voice call continuity request for handover from packet switched access of a source radio access network to circuit switched access of a target radio access network, a first output configured to send a query (e.g. to SCC AS or ATCF) to determine whether last active session is a voice only or a video session, and a second input configured to receive a response to said query indicating whether said last active session is a voice only or a video session.

According to a further embodiment, the apparatus further comprises a processor configured to reserve a call bearer from said target radio access network. In some embodiments, said processor is configured to reserve a voice call bearer from said target radio access network, in case said last active session is a voice only session. In some embodiments, said voice call bearer is a TS11 bearer. In some embodiments, said processor is configured to reserve a multimedia call bearer from said target radio access network, in case said last active session is a video session. In some embodiments, said multimedia call bearer is a B530 bearer.

In some embodiments, said query and said response comprise session initiation protocol signaling messages. In some embodiments, said query comprises a SIP SUBSCRIBE or a SIP INVITE message. In some embodiments, said response comprises a SIP NOTIFY or a SIP INFO message.

In some embodiments said request is received from a mobility management entity. In some embodiments, said query is sent to service consistency and continuity application server or access transfer control function.

According to a further embodiment, said apparatus further comprises a second output configured to forward a handover command from said target radio access network to said mobility management entity. According to a yet further embodiment, said processor is configured to start session continuity procedures with consistency and continuity application server or access transfer control function.

According to yet a further embodiment, said processor is further configured to reserve a voice call bearer from said target radio access network in case said multimedia call bearer is not available. In some embodiments, said voice call bearer is a TS11 bearer. In some embodiments, said multimedia bearer is a BS30 bearer.

According to a third aspect of the invention, there is provided an apparatus (e.g. an SCC AS or an ATCF) comprising an input configured to receive a query to determine whether last active session is a voice only or a video session, and an output configured to send a response to said query indicating whether said last active session is a voice only or a video session.

In some embodiments, said query and said response comprise session initiation protocol signaling messages. In some embodiments, said query comprises a SIP SUBSCRIBE or a SIP INVITE message. In some embodiments, said response comprises a SIP NOTIFY or a SIP INFO message.

According to a further embodiment, said processor is further configured to perform session continuity procedures with mobile switching centre.

According to a fourth aspect of the invention, there is provided a computer-readable medium encoded with instructions that, when executed in hardware, perform a process, the process comprising receiving a single radio voice call continuity request for handover from packet switched access of a source radio access network to circuit switched access of a target radio access network, sending a query to determine whether last active session is a voice only or a video session, and receiving a response to said query indicating whether said last active session is a voice only or a video session.

According to a further embodiment, the process further comprises reserving a call bearer from said target radio access network. According to a further embodiment, the process comprises reserving a voice call bearer from said target radio access network in case said last active session is a voice only session. In some embodiments, said voice call bearer is a TS11 bearer. According to a further embodiment, the process comprises reserving a multimedia call bearer from said target radio access network, in case said last active session is a video session. In some embodiments, said multimedia call bearer is a BS30 bearer.

In some embodiments, said query and said response comprise session initiation protocol signaling messages. In some embodiments, said query comprises a SIP SUBSCRIBE or a SIP INVITE message. In some embodiments, said response comprises a SIP NOTIFY or a SIP INFO message.

In some embodiments, said request is received from a mobility management entity. In some embodiments, said query is sent to service consistency and continuity application server or access transfer control function. In some embodiments, said process is performed at a mobile switching centre server.

According to a further embodiment, said process further comprises forwarding a handover command from said target radio access network to said mobility management entity. According to a further embodiment, said process further comprises starting session continuity procedures with consistency and continuity application server or access transfer control function.

According to a further embodiment, said process further comprises reserving a voice call bearer from said target radio access network in case said multimedia call bearer is not available. In some embodiments, said voice call bearer is a TS11 bearer. In some embodiments, said multimedia bearer is a BS30 bearer.

According to a fifth aspect of the invention, there is provided a system comprising said apparatuses (e.g. a MSC enhanced for SRVCC and an SCC AS/ATCF).

Although the various aspects, embodiments and features of the invention are recited independently, it should be appreciated that all combinations of them are possible and within the scope of the present invention as claimed.

Embodiments of the present invention may have one or more of following advantages:
Saving radio resources
Selecting an optimal radio bearer for each SRVCC session
Faster handover time
More reliable SRVCC handovers

BRIEF DESCRIPTION OF DRAWINGS

For proper understanding of the invention, reference should be made to the accompanying drawings, wherein:

FIG. 7 illustrates an apparatus (an MSC server) according to certain embodiments of the present invention.

FIG. 8 illustrates an apparatus (a SCC AS/ATCF) according to certain embodiments of the present invention.

DETAILED DESCRIPTION OF THE PREFERRED EMBODIMENT(S)

Figure 1:
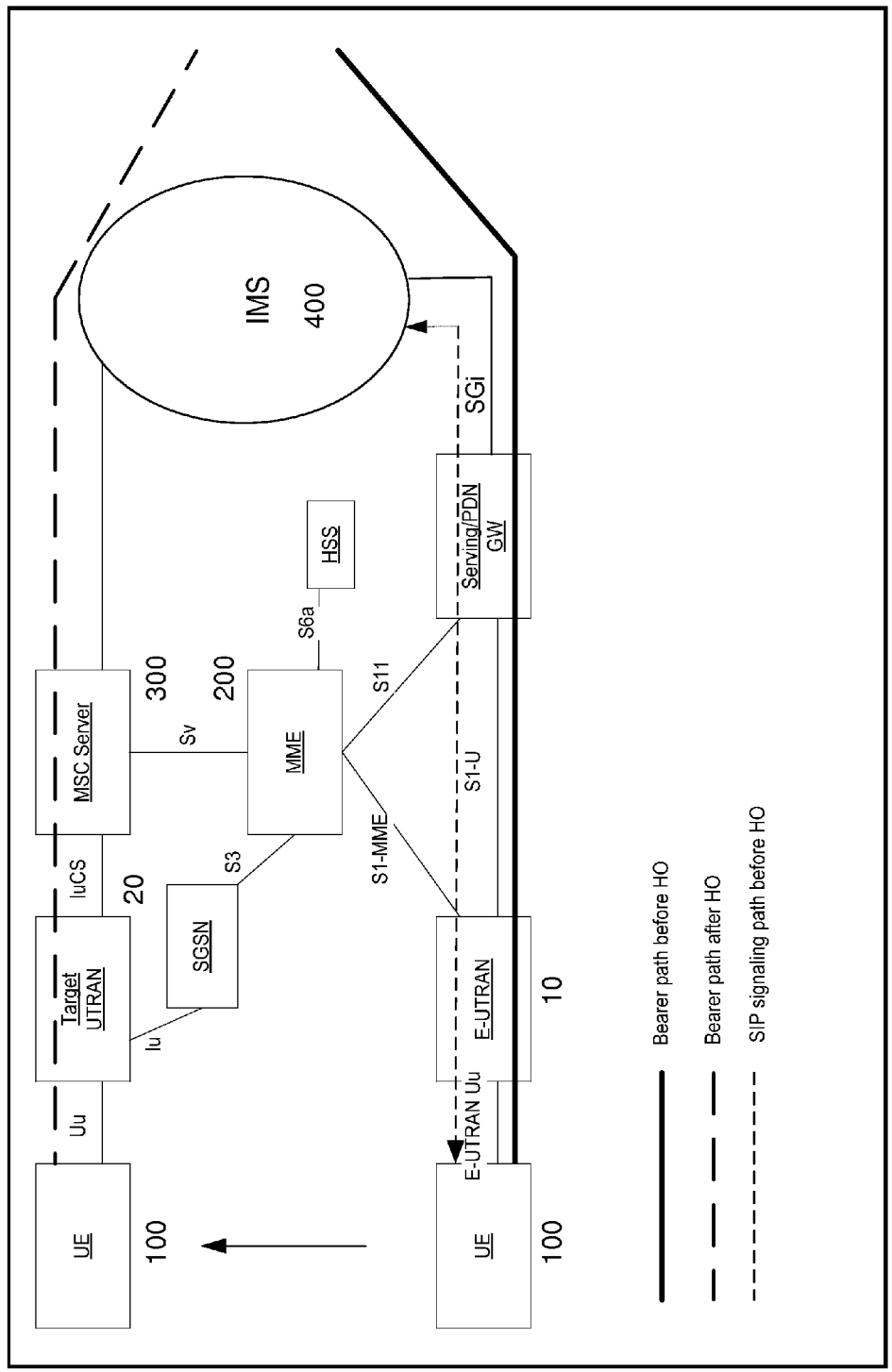
FIG. 1 illustrates a reference architecture for vSRVCC from E-UTRAN to 3GPP UTRAN, according to 3GPP.

FIG. 1 shows a reference architecture for vSRVCC from E-UTRAN 10 to 3GPP UTRAN/GERAN, according to 3GPP rel 10. Only the necessary components related to a mobile switching centre (MSC) server 300 enhanced for vSRVCC are shown for the reasons of simplicity.

A UE 100 is initially attached to E-UTRAN 10 radio access network 10 (the source network of SRVCC/vSRVCC) and served by a mobility management entity (MME) 200. The UE 100 receives services from 3GPP IMS 400 via a serving/packet data network gateway (S-/PDN-GW). When SRVCC/vSRVCC is needed, the MME communicates with an MSC server (enhanced for SRVCC/vSRVCC) 300 of UTRAN 20 radio access network 20 (the target network of SRVCC/vSRVCC).

In addition to the standard MSC server behavior, the MSC server 300 which has been enhanced for vSRVCC may provide the following functions as needed for support of vSRVCC: Transfers initially "voice-only" when the Sv request comes from the source MSC server 300, initiates the handover towards the target system for multimedia call bearer when it receives the Sv request from the MME 200, and selects a preconfigured default voice codec for vSRVCC usage.

For facilitating session transfer, in the case of SRVCC, of the voice component to the CS domain, the IMS multimedia telephony sessions needs to be anchored in the IMS 400. For facilitating session transfer, in the case of vSRVCC, of the voice and video component to the CS domain, the IMS multimedia session needs to be anchored in the IMS 400.

Figure 2:
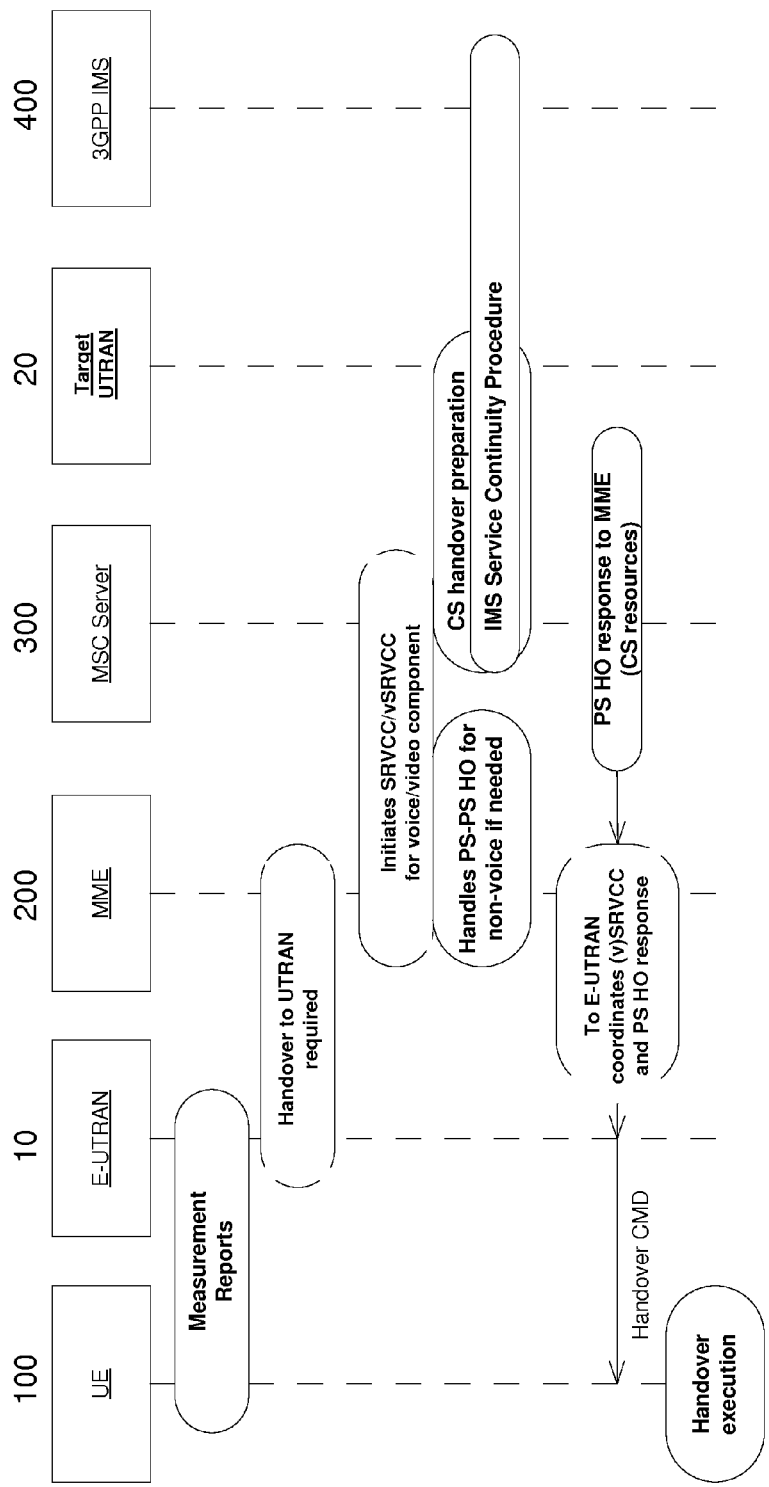
FIG. 2 illustrates a signaling diagram for a method according to certain embodiments of the present invention.

FIG. 2 illustrates overall high level concepts for SRVCC/vSRVCC from E-UTRAN 10 to UTRAN 20. For SRVCC from E-UTRAN 10 to UTRAN 20, MME 200 first receives the handover request from E-UTRAN 10 with the indication that this is for SRVCC handling, and then triggers the SRVCC procedure with the MSC server 300 enhanced with SRVCC via the Sv reference point. MSC server 300 enhanced for SRVCC then initiates the session transfer procedure to IMS 400 and coordinates it with the CS handover procedure to the target cell. MSC server 300 enhanced for SRVCC then sends PS-to-CS handover Response to MME 200, which includes the necessary CS handover (HO) command information for the UE 100 to access the UTRAN 20.

For vSRVCC from E-UTRAN 10 to UTRAN 20, MME 200 first receives the handover request from E-UTRAN 10 with the indication that this is for SRVCC handling. The E-UTRAN 10 may also include an indication that this is intended for vSRVCC. If vSRVCC indication is not included, the local configuration within MME 200 with existing bearer indication (i.e. quality of service class indicator (QCI) QCI-x where video bearer is used) can be used to trigger vSRVCC procedure with the MSC server 300 enhanced with SRVCC via the Sv reference point. MSC server 300 enhanced for vSRVCC then initiates the session transfer procedure to IMS 400 and coordinates it with the CS handover procedure to the target cell. MSC server 300 enhanced for SRVCC then sends PS-to-CS handover response to MME 200, which includes the necessary CS HO command information for the UE 100 to access the UTRAN 20.

Possible handling of any non-voice PS bearer is done by the PS bearer splitting function in the MME 200. MME 200 starts the handover of non-voice PS bearer during SRVCC procedure based on the information received from N-UT-RAN 10. The handover of non voice PS bearer (s), if performed, may be done as according to inter (radio access technology) RAT handover procedure as defined 3GPP. The MME 200 is responsible to coordinate the forward relocation response from PS to PS handover procedure and the SRVCC PS-to-CS Response.

One solution for vSRVCC to handle multiple IMS sessions with each session having voice+video is that the UE 100 and the service consistency and continuity application server (SCC AS) will selected the latest active voice and video session for the transfer. It is proposed that the MSC server 300 executes a SRVCC voice session transfer first, while the MSC server 300 tries to reserve resources for a BS30 radio access bearer (RAP) towards the target radio access network (RAN). BS30 is a multimedia call, bearer service specified for CS. In case the target radio access network (RAN) is GERAN the subsequent handover procedure is similar to SRVCC (i.e. only voice is transferred). In case the target RAN is UTRAN 20 and the BS30 bearer reservation was successful, voice media only would be transported over the BS30 bearer in the first place after the handover until the video negotiation procedure is finished. The UE 100 selects a default voice codec configured by the operator for vSRVCC use only.

In the above mentioned proposal, the BS30 RAB is always reserved for the CS UTRAN video call, this bearer is used after the call has been transferred to the CS domain. On the other hand, the SCC AS and UE 100 need to select the IMS session which will be transferred to the CS domain, in case the UE 100 has several ongoing IMS sessions in E-UTRAN 10. This works fine when each of the sessions are having both voice+video. However, this proposal does not work if one of those sessions is voice only. For instance, according to the previous proposal, if the UE 100 has two sessions, video session on hold and voice session is active, the SCC AS will select voice session. If the to-be-transferred IMS session is a video telephony session, there is no issue, as the radio resources are reserved for CS video telephony call (i.e. for BS30) from the target RAT. But if the SCC AS and UE 100 selects the voice call as the session to-be-transferred, there is a problem that the BS30 radio resources are reserved, even though the call is voice-only and thus radio resources are wasted, as audio uses a smaller hit rate than video (e.g. 1.2 kbit/s compared to 64 kbit/s which is reserved in case of BS30), and also the frame handling for CS voice is different than CS video.

According to the present invention, the order of the sequence of the steps is changed in a way, that the MSC server 300 does not initiate the handover to the target RAN immediately after the reception of the PS-to-CS HO request from MME 200. Instead, the MSC server 300 communicates with the SCC AS, in order to find out whether the to-be-transferred session is voice or video. If the SCC AS indicates to MSC server 300 that video session is going to be transferred, then the MSC server 300 proceeds with the vSRVCC, i.e. MSC sends the prepare HO request to the target MSC, and tries to reserve the BS30 bearer from the target RAN. But if the SCC AS indicates that a voice session is to be transferred, the MSC server 300 sends the prepare HO request to the target RAN for voice session, and this causes a reservation of: TS11 radio bearer in target RAN. TS11 is a speech call bearer service specified for CS.

The communication with SCC AS may be done as a standalone transaction; the MSC server 300 may send a SIP SUBSCRIBE request to the SCC AS, e.g. for dialog event package, and the SCC AS responds with SIP NOTIFY with the body which indicates whether the active session (i.e. the session to be transferred in case of vSRVCC) is voice or video.

Alternatively, the communication may be embedded to the domain transfer (SIP INVITE) transaction; the MSC server 300 prepares the SDP offer for voice and sends an INVITE to the SCC AS. The SCC AS updates the remote leg and returns an indication to the MSC server 300, whether the SCC AS selected a voice or video session as a target for SRVCC. This indication may be returned e.g. in the body of SIP INFO request. MSC server 300 then sends the prepare HO request to the target MSC, and tries to reserve either the BS30 or TS11 bearer from the target RAN, depending on the indication returned from the SCC AS.

With both alternatives, after the SRVCC completion, since the UE 100 implements the same session selection logic than SCC AS, the UE 100 is able to determine whether the session which was transferred was voice or video, and in the latter case the UE 100 starts the H.245 negotiation with the MSC server 300, after which the video media is added back to the session towards the remote end.

The session transfer procedure towards IMS 400 for the voce media is the same as in SRVCC. When the UE 100 receives the HO command with the transparent container indicating the allocated resources is a TS11 or BS30 bearer, it knows whether it should start the H324M video codec negotiation or not. In case of UTRAN 20 and BS30 resources are available, the MSC server 300 sends after the finished CS 3G-324M negotiation a new session transfer message to request the addition of the video media.

Figure 3:
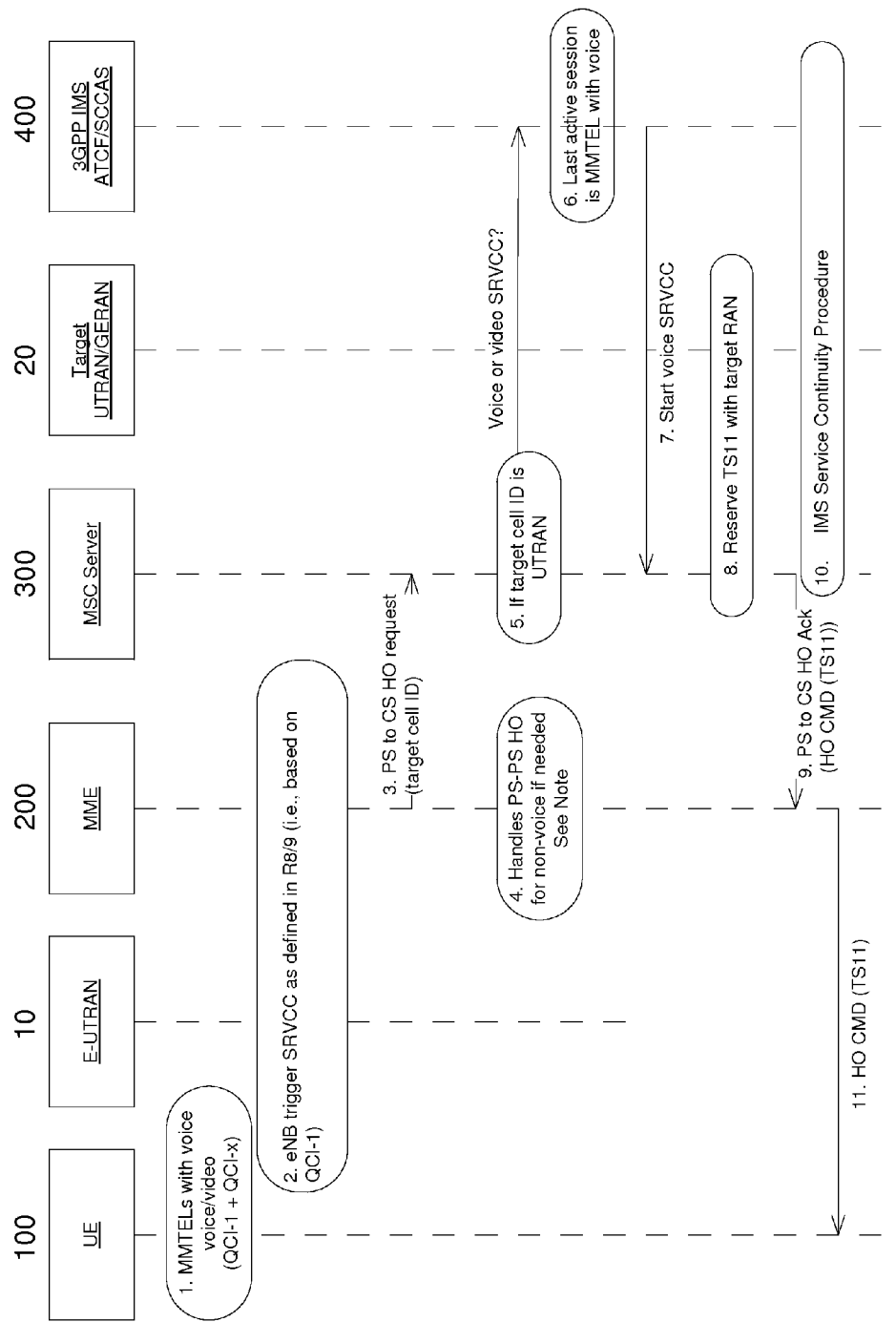
FIG. 3 illustrates a signaling diagram for a method according to certain embodiments of the present invention.

FIG. 3 shows how SRVCC according no the invention may be implemented:

1. UE 100 has an active multimedia telephony service (MMTEL) with voice only, and placed the ongoing MMTEL session with voice+video on HOLD. Voice is using QCI-1 (as per 3GPP SRVCC specification since rel 8).

2. Evolved NodeB (eNb) performs SRVCC operation based on QCI-1 (as specified in 3GPP rel 10).

3. MME 200 sends PS-to-CS HO request to SRVCC MSC server 300 (as specified in 3GPP rel 10), S1 of FIG. 5. The request may include international mobile subscriber identity (IMSI), target ID, session transfer number for SRVCC (STN-SR), correlation mobile subscriber international integrated services digital network (ISDN) number (C-MSISDN), generic source to target transparent container, mobility management (MM) context, and/or emergency indication.

4. MME 200 handles the PS-to-PS HO (as specified in 3GPP rel 10). Based on local MME configuration, the bearer allocated for the video component can be deactivated locally. This avoids unnecessary PS resource reservation on the target side.

5. Based on target cell ID (target ID of HO request), MSC server 300 can determine if the target RAN is UTRAN 20 or GERAN. If it is UTRAN 20, MSC server 300 queries to SCC AS or if enhanced SRVCC architecture is used then the queries go to access transfer control function (ATCF) (as defined in 3GPP Rel 10), S2 in FIGS. 5 & 6. This allows the MSC server 300 to determine if video SRVCC is to be performed or not.

6. In this case, the last active session is voice only.

7. SCC AS/ATCF indicates "voice only" status to MSC server 300, S3 in FIGS. 5 & 6.

8. MSC server 300 reserves TS11 from target RAN, S4*a* in FIG. 6.

9. HO command from target RAN is conveyed back to MME 200

10. MSC server 300 starts the session continuity procedure with SCC AS/ATCF.

11. MME 200 forwards the HO command back to UE 100. The HO command carries the resource info (TS11).

Figure 5:
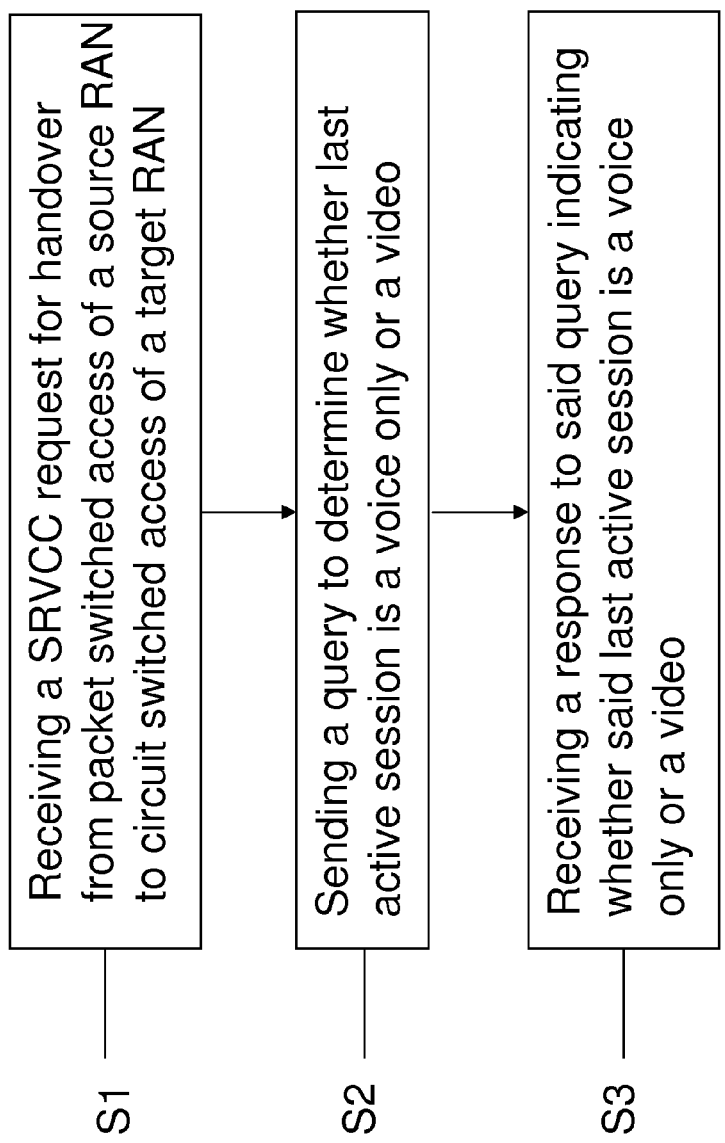
FIG. 5 illustrates a method according to certain embodiments of the present invention.
Figure 6:
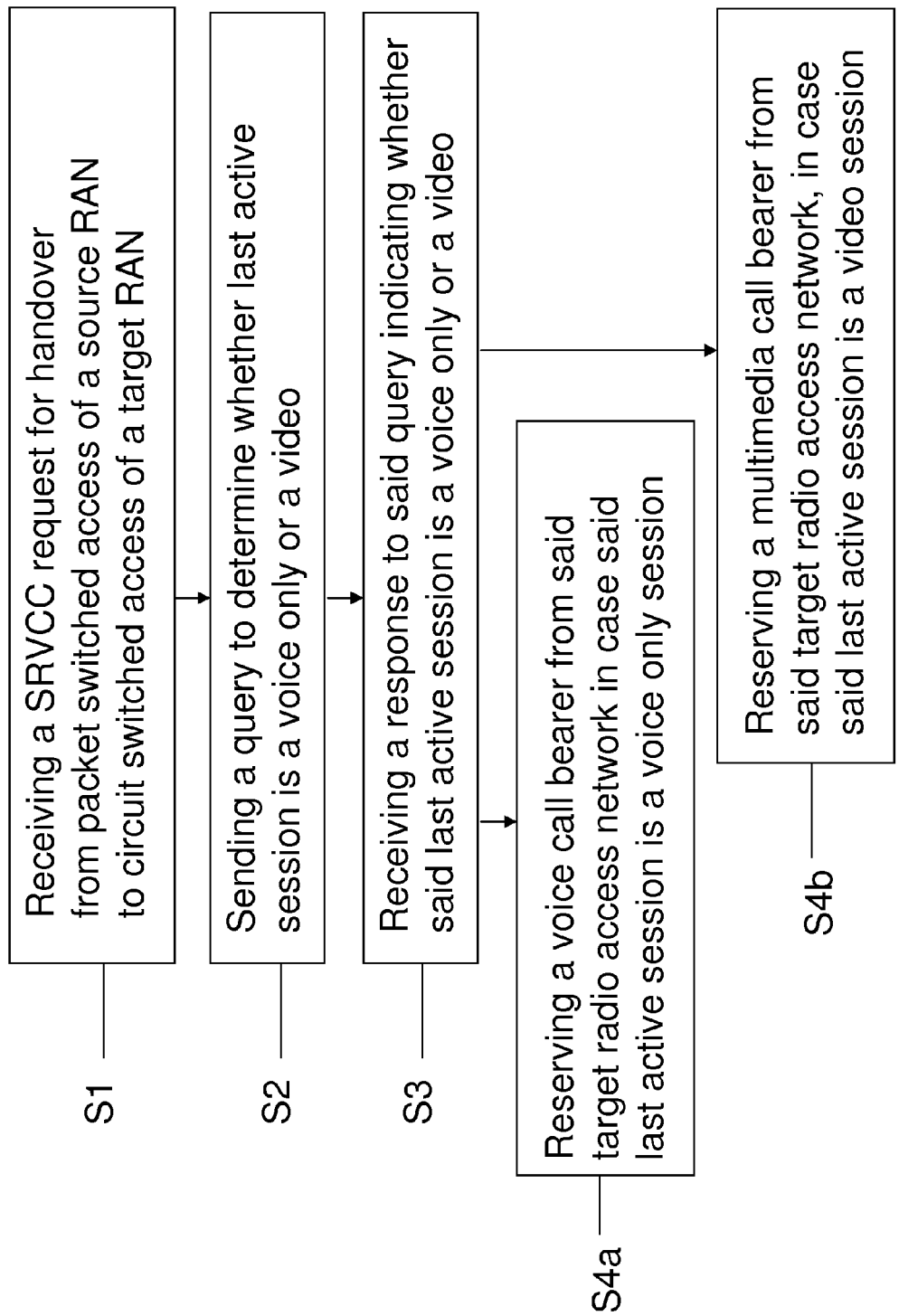
FIG. 6 illustrates a method according to certain embodiments of the present invention.

If the last active session is voice+video, then SCC AS/ATCF will indicate this status in step 7, S3 in FIGS. 5 & 6, and MSC server 300 will reserve BS30 from target RAN, S4*b* of FIG. 6. The rest of the steps (8 to 11) remain the same as for voice.

Figure 4:
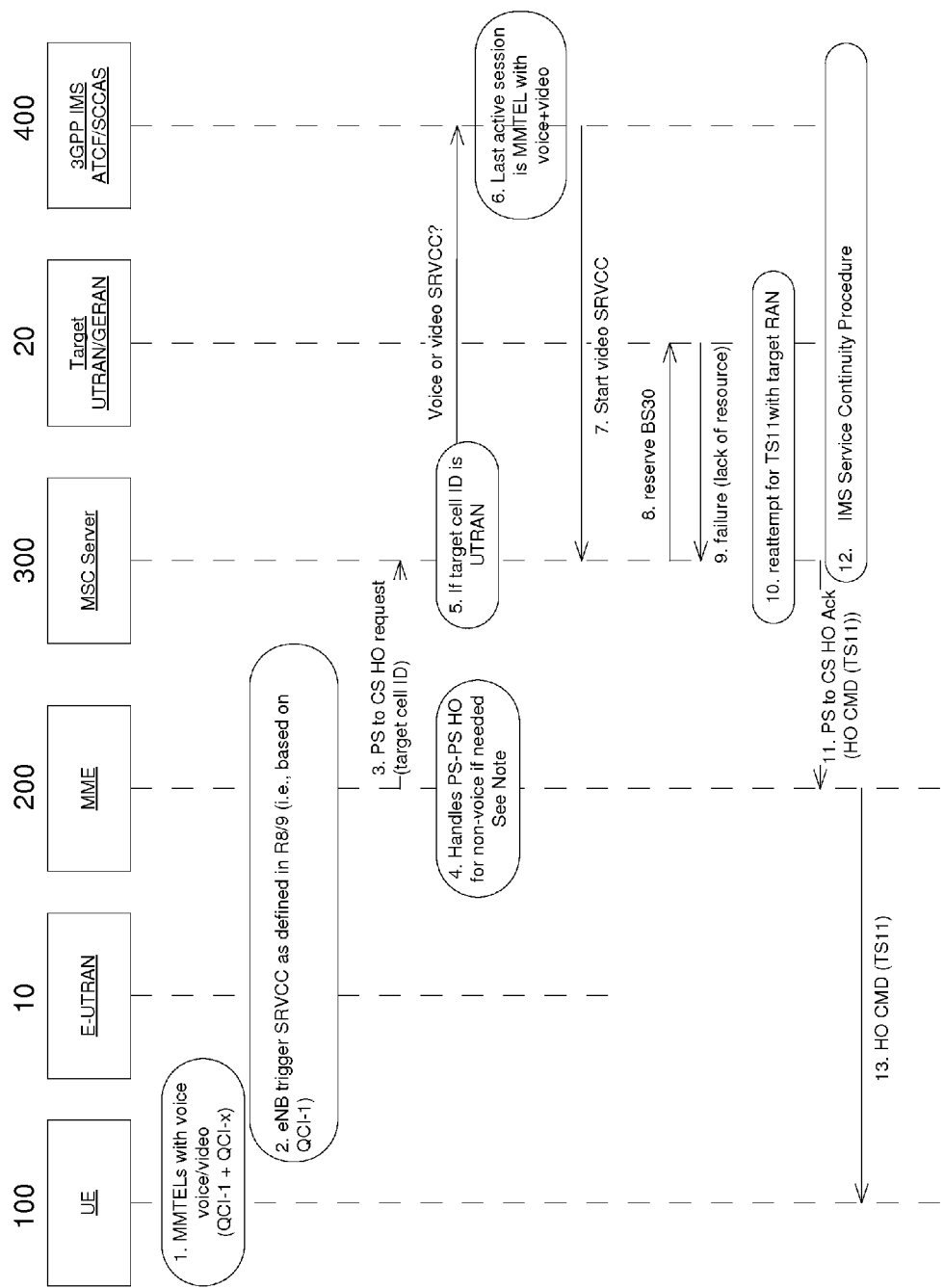
FIG. 4 illustrates a signaling diagram for a method according to certain embodiments of the present invention.

FIG. 4, illustrates a further possible scenario of the present invention when MSC server 300 requests the target RAN for BS30 but it is rejected due to lack of BS30 resources. To resolve this scenario, the MSC server 300 reattempt the target RAN resource request with TS 11. The following figure illustrates this procedure. The key point here is that in step 13, the HO command contains only the resource for TS11. This indicates to the UE 100 that the MMTEL with voice+video is becoming voice only after SRVCC and not CS video. In step 12, MSC server 300 can indicate to SCC AS/ATCF that only voice is being transferred.

FIG. 7 illustrates an example of an MSC server 300 according to certain embodiments. In one embodiment, the MSC server may include at least one processor 301, at least one memory 302, and at least one transceiver 303. The memory 302 may include computer program instructions or computer code contained therein.

FIG. 8 illustrates an example of a SCC AS or ATCF 500 according to certain embodiments. In one embodiment, the SCC AS or ATCF 500 includes at least one processor 501 and at least one transceiver 502.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the scope of the invention.

The invention claimed is:

1. A method comprising:
   receiving a single radio voice call continuity request in a multi-session scenario for handover from packet switched access of a source radio access network to circuit switched access of a target radio access network;
   sending a query to determine whether last active session is a voice only or a video session;
   receiving a response to said query indicating whether said last active session is a voice only or a video session;
   reserving a call bearer from said target radio access network; and
   reserving a voice call bearer from said target radio access network in case said last active session is a voice only session.

2. The method according to claim 1, wherein said voice call bearer is a TS11 bearer.

3. The method according to claim 1, further comprising:
   reserving a multimedia call bearer from said target radio access network, in case said last active session is a video session.

4. The method according to claim 3, wherein said multimedia call bearer is a BS30 bearer.

5. The method of claim 1, wherein said query and said response comprise session initiation protocol signaling messages.

6. The method of claim 5, wherein said query comprises a SIP SUBSCRIBE or a SIP INVITE message.

7. The method of claim 5, wherein said response comprises a SIP NOTIFY or a SIP INFO message.

8. The method of claim 1, wherein said request is received from a mobility management entity.

9. The method of claim 1, wherein said query is sent to service consistency and continuity application server or access transfer control function.

10. The method of claim 1, wherein said method is performed at a mobile switching centre server.

11. The method of claim 1, further comprising:
    forwarding a handover command from said target radio access network to said mobility management entity.

12. The method of claim 1, further comprising:
    starting session continuity procedures with consistency and continuity application server or access transfer control function.

13. The method of claim 3, further comprising reserving a voice call bearer from said target radio access network in case said multimedia call bearer is not available.

14. The method of claim 13, wherein said voice call bearer is a TS11 bearer.

15. The method of claim 13, wherein said multimedia bearer is a BS30 bearer.

16. An apparatus, comprising:
    at least one memory comprising computer program code;
    at least one processor;
    wherein the at least one memory and the computer program code are configured, with the at least one processor, to cause the apparatus at least to:
    receive a single radio voice call continuity request in a multi-session scenario for handover from packet switched access of a source radio access network to circuit switched access of a target radio access network;
    send a first query to determine whether last active session is a voice only or a video session;
    receive a response to said first query indicating whether said last active session is a voice only or a video session;
    reserve a call bearer from said target radio access network; and
    reserve a voice call bearer from said target radio access network, in case said last active session is a voice only session.

17. The apparatus according to claim 16, wherein said voice call bearer is a TS11 bearer.

18. The apparatus according to claim 16, wherein the at least one memory and the computer program code are configured, with the at least one processor, to cause the apparatus at least to:
reserve a multimedia call bearer from said target radio access network, in case said last active session is a video session.

19. The apparatus according to claim 18, wherein said multimedia call bearer is a BS30 bearer.

20. The apparatus of claim 18, wherein the at least one memory and the computer program code are configured, with the at least one processor, to cause the apparatus at least to:
reserve a voice call bearer from said target radio access network in case said multimedia call bearer is not available.

21. The apparatus of claim 20, wherein said voice call bearer is a TS11 bearer.

22. The apparatus of claim 20, wherein said multimedia bearer is a BS30 bearer.

23. The apparatus of claim 16, wherein said query and said response comprise session initiation protocol signaling messages.

24. The apparatus of claim 23, wherein said query comprises a SIP SUBSCRIBE or a SIP INVITE message.

25. The apparatus of claim 23, wherein said response comprises a SIP NOTIFY or a SIP INFO message.

26. The apparatus of claim 16, wherein said request is received from a mobility management entity.

27. The apparatus of claim 16, wherein said query is sent to service consistency and continuity application server or access transfer control function.

28. The apparatus of claim 16 comprising a mobile switching centre server.

29. The apparatus of claim 16, the at least one memory and the computer program code are configured, with the at least one processor, to cause the apparatus at least to:
forward a handover command from said target radio access network to said mobility management entity.

30. The apparatus of claim 16, wherein the at least one memory and the computer program code are configured, with the at least one processor, to cause the apparatus at least to:
start session continuity procedures with consistency and continuity application server or access transfer control function.

31. The apparatus of claim 16, wherein said query and said response comprise session initiation protocol signaling messages.

32. The apparatus of claim 31, wherein said query comprises a SIP SUBSCRIBE or a SIP INVITE message.

33. The apparatus of claim 31, wherein said response comprises a SIP NOTIFY or a SIP INFO message.

34. The apparatus of claim 16 comprising a service consistency and continuity application server or access transfer control function.

35. The apparatus of claim 16, wherein the at least one memory and the computer program code are configured, with the at least one processor, to cause the apparatus at least to:
perform session continuity procedures with mobile switching centre.

36. A non-transitory computer-readable medium encoded with instructions that, when executed in hardware, perform a process, the process comprising:
receiving a single radio voice call continuity request in a multi-session scenario for handover from packet switched access of a source radio access network to circuit switched access of a target radio access network;
sending a query to determine whether last active session is a voice only or a video session;
receiving a response to said query indicating whether said last active session is a voice only or a video session;
reserving a call bearer from said target radio access network; and
reserving a voice call bearer from said target radio access network in case said last active session is a voice only session.

37. The non-transitory computer-readable medium according to claim 36, wherein said voice call bearer is a TS11 bearer.

38. The non-transitory computer-readable medium according to claim 36, wherein the at least one memory and the computer program code are configured, with the at least one processor, to cause the apparatus at least to:
reserve a multimedia call bearer from said target radio access network, in case said last active session is a video session.

39. The non-transitory computer-readable medium according to claim 38, wherein said multimedia call bearer is a BS30 bearer.

40. The non-transitory computer-readable medium of claim 38, the process further comprising reserving a voice call bearer from said target radio access network in case said multimedia call bearer is not available.

41. The non-transitory computer-readable medium of claim 40, wherein said voice call bearer is a TS11 bearer.

42. The non-transitory computer-readable medium of claim 40, wherein said multimedia bearer is a BS30 bearer.

43. The non-transitory computer-readable medium of claim 36, wherein said query and said response comprise session initiation protocol signaling messages.

44. The non-transitory computer-readable medium of claim 43, wherein said query comprises a SIP SUBSCRIBE or a SIP INVITE message.

45. The non-transitory computer-readable medium of claim 43, wherein said response comprises a SIP NOTIFY or a SIP INFO message.

46. The non-transitory computer-readable medium of claim 36, wherein said request is received from a mobility management entity.

47. The non-transitory computer-readable medium of claim 36, wherein said query is sent to service consistency and continuity application server or access transfer control function.

48. The non-transitory computer-readable medium of claim 36, wherein said process is performed at a mobile switching centre server.

49. The non-transitory computer-readable medium of claim 36, said process further comprising:
forwarding a handover command from said target radio access network to said mobility management entity.

50. The non-transitory computer-readable medium of claim 36, said process further comprising:
starting session continuity procedures with consistency and continuity application server or access transfer control function.

51. A system, comprising:
a first apparatus, said first apparatus comprising:
at least one memory comprising computer program code;
at least one processor;
wherein the at least one memory and the computer program code are configured, with the at least one processor, to cause the first apparatus at least to:

receive a single radio voice call continuity request in a multi-session scenario for handover from packet switched access of a source radio access network to circuit switched access of a target radio access network;
send a first query to determine whether last active session is a voice only or a video session;
receive a response to said first query indicating whether said last active session is a voice only or a video session;
reserve a call bearer from said target radio access network; and
reserve a voice call bearer from said target radio access network in case said last active session is a voice only session; said system further comprising
a second apparatus comprising:
at least one memory comprising computer program code;
at least one processor;
wherein the at least one memory and the computer program code are configured, with the at least one processor, to cause the second apparatus at least to:
receive a second query to determine whether another last active session is a voice only or a video session, and send a response to the second query indicating whether the another last active session is a voice only or a video session.

* * * * *